United States Patent
Gettemy et al.

(10) Patent No.: US 8,558,977 B2
(45) Date of Patent: Oct. 15, 2013

(54) ELECTRONIC DEVICE DISPLAY STRUCTURES WITH ALIGNMENT FEATURES

(75) Inventors: Shawn R. Gettemy, San Jose, CA (US); Joshua G. Wurzel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 622 days.

(21) Appl. No.: 12/558,193

(22) Filed: Sep. 11, 2009

(65) Prior Publication Data

US 2011/0063550 A1    Mar. 17, 2011

(51) Int. Cl.
*G02F 1/1333*    (2006.01)
*G02F 1/13*    (2006.01)

(52) U.S. Cl.
USPC .............................. 349/110; 349/158; 349/187

(58) Field of Classification Search
USPC .......................... 349/106, 110, 129, 158, 187
See application file for complete search history.

(56) References Cited

U.S. PATENT DOCUMENTS

| | | |
|---|---|---|
| 4,812,830 A | 3/1989 | Doering |
| 5,422,751 A | 6/1995 | Lewis et al. |
| 6,061,231 A | 5/2000 | Crockett |
| 6,373,548 B1 * | 4/2002 | Kim ............................. 349/158 |
| 6,724,452 B1 * | 4/2004 | Takeda et al. ................. 349/139 |
| 2001/0022637 A1 * | 9/2001 | Yu ................................. 349/102 |
| 2006/0158511 A1 | 7/2006 | Harrold et al. |
| 2008/0204615 A1 * | 8/2008 | Shin et al. ....................... 349/38 |

* cited by examiner

*Primary Examiner* — Nathanael R Briggs
(74) *Attorney, Agent, or Firm* — Brownstein Hyatt Farber Schreck, LLP

(57) ABSTRACT

Electronic devices such as handheld electronic devices may have display modules. The display modules may be covered with a layer of protective cover glass. Peripheral portions of the cover glass may be coated with an opaque masking layer to block interior portions of the device from view. An opening in the opaque masking layer can be formed over an active portion of the display module. To facilitate alignment of the display module active area with the opening in the cover glass masking layer, the display module may be provided with alignment marks. The alignment marks may be formed in opposing corners at an end of the display module. The alignment marks may be formed from metal structures on one of the glass layers in the display module. An opaque masking layer that blocks stray backlight may have openings that are formed over the metal structures.

16 Claims, 8 Drawing Sheets

ELECTRONIC DEVICE DISPLAY STRUCTURES WITH ALIGNMENT FEATURES

BACKGROUND

This relates generally to electronic devices, and more particularly, to alignment of display structures within electronic devices.

Electronic devices such as handheld electronic devices often include displays. For example, a cellular telephone may have color touch screen display. To protect the display from damage, the display may be covered with a protective layer of glass. This layer, which is typically referred to as the cover glass, helps prevent scratches from damaging sensitive display structures.

A cover glass layer may be provided with a peripheral opaque mask. The mask may have a transparent opening though which the underlying display may be viewed. The mask itself may be formed from a black ink. Use of the opaque mask may help improve device aesthetics, because unsightly interior portions of the device are hidden from view by the mask. However, the presence of the mask may make it difficult or impossible to satisfactorily align the display underneath the cover glass.

It would therefore be desirable to be able to provide improve alignment techniques for displays in electronic devices.

SUMMARY

Electronic devices such as handheld electronic devices may have display modules. The display modules may be based on liquid crystal display technology. Active display pixels may be formed in an active area of the display module. Opposing glass layers may encase the display pixels. The lower surface of the uppermost glass layer may be provided with an opaque masking layer to block stray light from a backlight structure in the device. The upper surface of the lowermost glass layer may be provided with metal alignment structures. Openings may be formed in the opaque masking layer to allow the alignment structures to be visually inspected during alignment and assembly operations.

A display module in a device may be protected with a layer of cover glass. Peripheral portions of the cover glass may be coated with an opaque masking layer to block interior portions of the device from view. A rectangular opening in the opaque masking layer can be formed over the active portion of the display module to allow an image that is formed in the active portion of the display module to be viewed by a user of the device. To facilitate alignment of the display module active area with the opening in the cover glass masking layer, the alignment marks may be visually inspected using an alignment and assembly tool. Once the alignment marks have been placed into alignment with the edge of the opening in the opaque masking layer on the cover glass, the cover glass may be attached to the display module using adhesive.

Further features of the invention, its nature and various advantages will be more apparent from the accompanying drawings and the following detailed description of the preferred embodiments.

DETAILED DESCRIPTION

Alignment features may be provided for displays in electronic devices.

The electronic devices may desktop computers, televisions, or other consumer electronics equipment. The electronic devices may also be portable electronic devices such as laptop computers or small portable computers of the type that are sometimes referred to as ultraportables. If desired, portable electronic devices may be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

Figure 1:
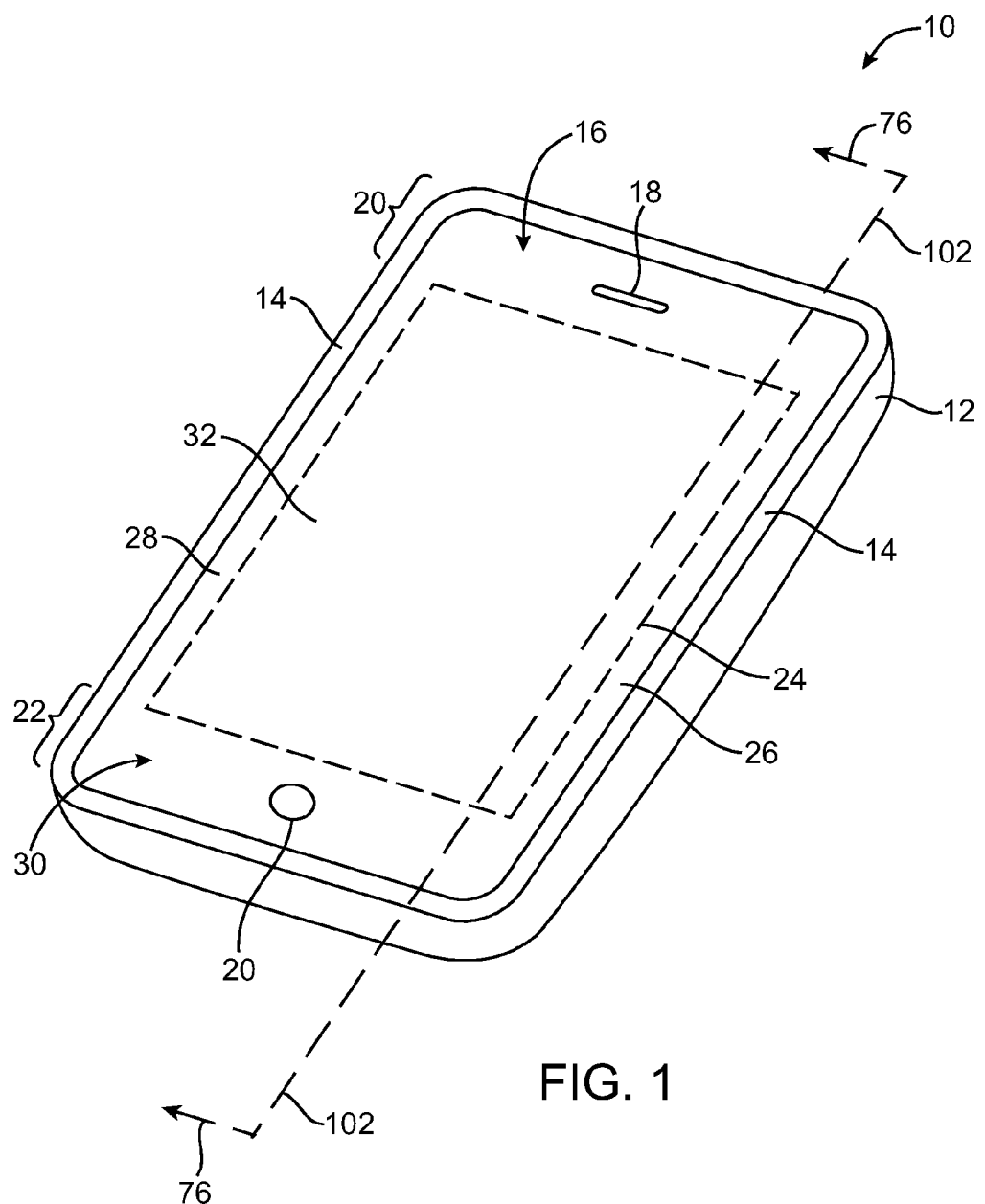
FIG. 1 is a perspective view of an illustrative electronic device that includes a display with alignment structures in accordance with an embodiment of the present invention.

Handheld electronic devices and other electronic devices may include displays. An illustrative electronic device of the type that may have a display is shown in FIG. 1. Device 10 of FIG. 1 may be, for example, a handheld electronic device such as a cellular telephone with circuitry that runs email and other communications applications, web browsing applications, media playback applications, games, etc.

Device 10 may have housing 12. Antennas for handling wireless communications may be housed within housing 12 (as an example). Housing 12 may be formed of any suitable materials including, plastic, glass, ceramics, metal, other suitable materials, or a combination of these materials. Bezel 14 may be formed from a conductive material and may serve to hold display 16 on device 10. Bezel 14 may also form an aesthetically pleasing trim around the edge of device 10. If desired, displays such as display 16 may be mounted in housing 12 without using bezel 14.

Display 16 may be a liquid crystal display (LCD), an organic light emitting diode (OLED) display, a plasma display, an electronic ink display, or any other suitable display. A protective outer layer of plastic or glass may be provided over the outermost surface of display 16 to protect display 16 from damage. This layer is sometimes referred to herein as a cover glass layer. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 20, input-output connectors for signal ports, a speaker such as speaker 18, and other input-output devices.

In the example of FIG. 1, display 16 is shown as being mounted on the front face of handheld electronic device 10, but display 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

Display 16 may have an active portion that contains image pixels and an inactive portion. In inactive portions 30, no image is created. In active portion 32 of display 16, image pixels can be controlled to display a desired image. In the example of FIG. 1, active portion 32 of display 16 lies within dashed rectangle 24. Peripheral inactive portion 30 of display 16 lies outside of rectangle 24. Upper region 20 and lower region 22 may be inactive display regions. Portion 26 along the right hand boarder of display 16 and portion 28 along the left hand boarder of display 16 may also be inactive regions. These inactive portions form a peripheral inactive boundary (inactive area 30) that surrounds rectangular active region 32.

To block internal structures in the inactive regions of display 16 from view by a user of device 10, the cover glass of display 16 may be provided with an opaque mask. The opaque mask may be formed from a black ink or other substance that blocks visible light. The opaque mask may be formed over the inactive portions of display 16. For example, the periphery of the cover glass of display 16 may be provided with an interior coating of black ink. The portion of the cover glass that overlaps active region 32 may be uncovered with ink so that this region remains transparent.

The structure in display 16 that is used in generating images is sometimes referred to as a display module. Display 16 may, for example, have an LCD display module that produces images using LCD technology (as an example). A microprocessor and other control circuitry in device 10 may supply the display module with image data using a cable. The cable may be formed from conductive traces on a flexible printed circuit board substrate such as a printed circuit board substrate formed from polyimide or other polymers (i.e., a flex circuit cable). The flex circuit cable may be connected to the display module using conductive adhesive.

Display driver circuitry may be provided in the form of one or more integrated circuits mounted in the display module. The flex circuit may supply signals to the display driver circuitry. The display driver circuitry may, in turn, drive image signals into an array of thin film transistors in the display. These transistors may be used in generating an electric field that controls the orientation of the liquid crystal material in the display module. As the orientation of the liquid crystal material changes, the polarization of the liquid crystal material changes. Polarizer layers and backlight structures that are associated with the display module may be used to convert polarization changes into a displayed image.

Display modules have an active area that contains image pixels. For example, an LCD display module may contain a central rectangular region in which the thin film transistors and liquid crystal material form image pixels. Other types of displays such as plasma displays, organic light-emitting diodes displays, and electronic ink displays also have active areas in which image pixels are formed. These active areas are generally surrounded by inactive areas.

Figure 2:
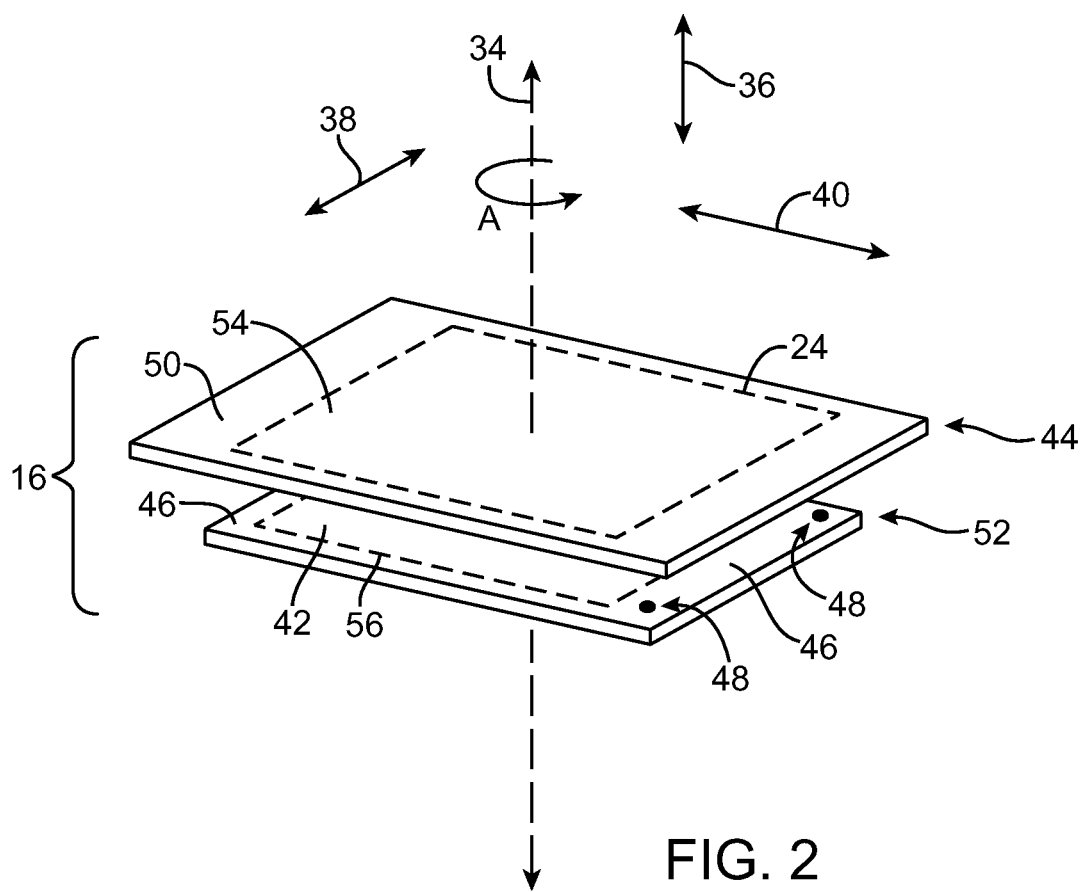
FIG. 2 is a perspective view of an illustrative cover glass and an illustrative display module with alignment structures in accordance with an embodiment of the present invention.

During assembly, it is generally desirable to align the active portion of the display module with the transparent opening in the opaque mask of the cover glass. This alignment process is illustrated in FIG. 2. As shown in FIG. 2, display 16 may include cover glass structures 44 and display module 52. Structures for providing display 16 with touch sensor functionality (e.g., a layer of transparent indium-tin oxide electrodes for a capacitive touch sensor array) may be attached to the underside of the cover glass in display 16 and are therefore sometimes considered to form part of cover glass structures 44. Because structures 44 generally include a layer of cover glass, cover glass structures 44 are sometimes referred to as cover glass 44.

The periphery of cover glass 44 may have a masking layer 50. Masking layer 50 may be formed from black ink or other opaque masking material. This opaque material may be formed on the underside of cover glass 44 around the periphery of cover glass 44 (i.e., in the general shape of inactive area 30 of FIG. 1). Central opening 54 of cover glass 44 (i.e., the rectangular portion of cover glass 44 that lies within dashed line 24) has the general shape of active area 32 of FIG. 1 and is not covered by opaque mask 50.

A central rectangular region that lies within dashed line rectangle 56 may form active region 42 of display module 52. The rectangle formed by dashed line 56 may have approximately the same size and shape as the rectangle formed by dashed line 24 (i.e., the active area of display module 52 may be approximately the same size as opening 54 in cover glass 44). The portions of display module 52 that lie outside of rectangle 56 may form inactive portions 46 of display module 52.

During assembly, display module 52 and cover glass 44 may be attached to each other using adhesive (e.g., clear pressure sensitive adhesive). To ensure that masking layer 50 does not inadvertently obscure active portions 42 of display module 52, display module 52 and cover glass 44 may be aligned. For example, cover glass 44 and module 52 may be aligned along lateral dimensions 38 and 40 (i.e., parallel to the width and length of cover glass 44). Cover glass 44 and display module 52 may also be aligned about rotational axis 34 (i.e., to control the relative angle A). Cover glass 44 and module 52 may also be moved relative to each other along vertical dimension 36 parallel to the height of cover glass 44 (e.g., when it is desired to attach cover glass 44 to module 52).

When cover glass 44 and display module 52 are properly aligned, the edges of mask 50 will be aligned with the edges of inactive area 56 and the edges of clear opening 54 will therefore be aligned with the edges of active display area 42. Aligning active display area 42 of display module 52 with opening 54 in mask 50 on cover glass 44 in this way ensures that active area 42 will be visible to a user of device 10 through opening 54 (i.e., there will be no skew between active area 42 and opening 54 that might otherwise block part of the edges of active area 42 from view).

It may be difficult or impossible to visually identify the location of the boundary of active region 42 when display module 52 is not powered, particularly when display module 52 is formed using normally-black display technology. It may therefore be desirable to include one or more alignment features in display module 52. For example, alignment marks such as alignment marks 48 may be formed on display module 52. These alignment structures can be fabricated in alignment with the edges of active area 42, so alignment between display module 52 and cover glass 44 can be achieved by aligning the alignment marks on display module 52 with cover glass 44 (e.g., by aligning marks 48 with the edges of opening 54).

Figure 3:
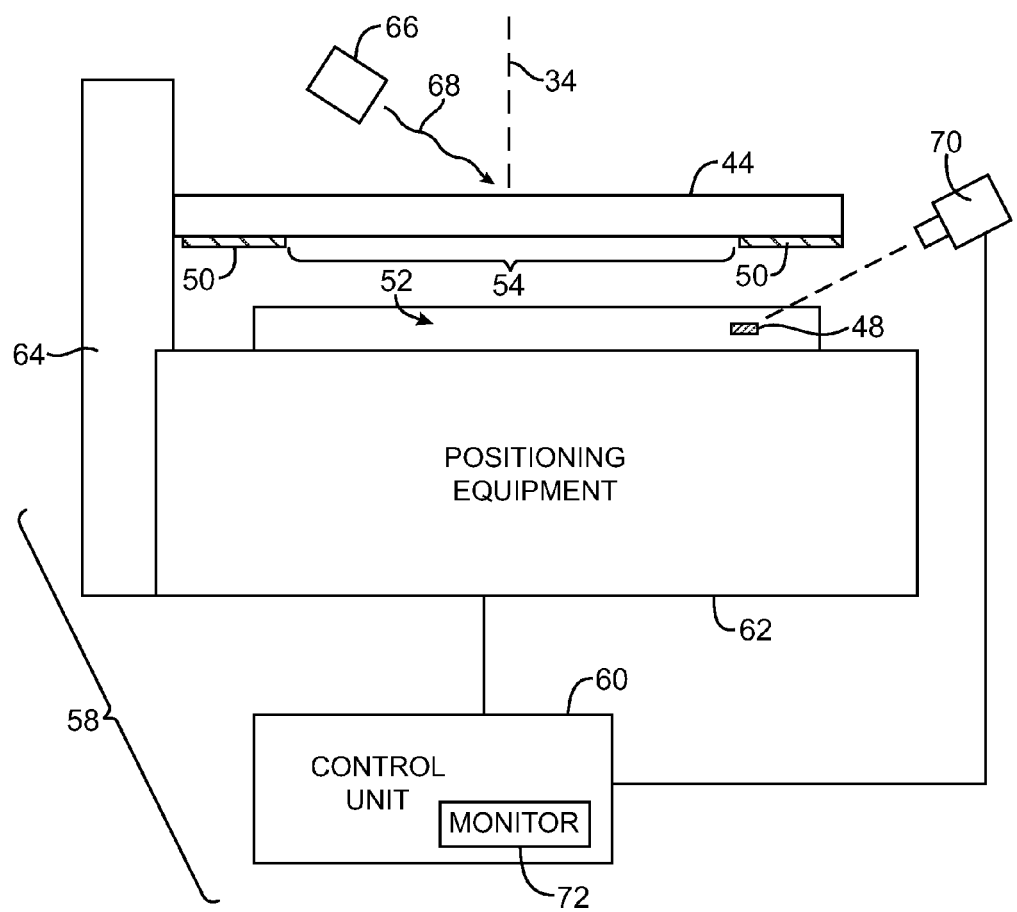
FIG. 3 is a cross-sectional side view of a system that may be used to align and assemble a display for an electronic device in accordance with an embodiment of the present invention.

Alignment operations can be performed with the aid of an alignment and assembly system. A side view of an illustrative alignment and assembly system that may be used to align the edges of active area 42 of display module 44 so that they are parallel with the edges of opening 54 in mask 50 of cover glass 44 is shown in FIG. 3. As shown in the FIG. 3 example, alignment and assembly tool 58 may have a control unit such as control unit 60. Control unit 60 may be based on a computer or other suitable computing equipment and may have a user interface that allows tool 58 to be operated by a user. The user interface may be used in controlling system 58 with the computing equipment of unit 60. The user interface may include, for example, a display, a keyboard, a mouse or other pointing device, etc. The mechanical components of tool 58 such as positioning stage components may also be controlled manually (e.g., by physically positioning these components using adjustment knobs or other mechanically adjustable translation and rotation controls).

The relative position between cover glass 44 and display module 52 may be adjusted using positioning equipment 62 and 64. Positioning equipment 62 may include a vacuum chuck mounted to an x-y-z translation stage. A rotational mechanism may be used to control rotational alignment between cover glass 44 and display module 52. Positioning equipment 64 may be fixed or may include translation and rotational stages. Using the user interface in control unit 60, a user may operate control unit 60 and system 58. For example, the user may provide commands that direct control unit 60 to adjust the relative position between cover glass 44 and display module 52. Control unit 60 may make these adjustments by issuing analog or digital commands to positioning equipment 62 and 64. Manual user adjustments (e.g., using adjustment knobs on equipment 62 and 64) may also be used.

A user may visually align cover glass 44 to display module 52. Light sources such as light source 66 may be used to provide light 68 that illuminates cover glass 44 and display module 52. The user may view cover glass 44 and display module 52 using a microscope (e.g., a stereo microscope), using an unaided eye, using camera 70 (e.g., a microscope-based camera or other camera), using a combination of these visual inspection devices, or other suitable equipment. Images from camera 70 may be displayed on a monitor such as monitor 72 in control unit 60.

Alignment marks such as alignment mark 48 can be used to help the user ascertain the position of display module 52 (i.e., to determine the angle of orientation of the boundary that lies between active region 42 and inactive region 46 of display module 52). The angle of orientation of the edges of opening 54 in opaque mask layer 50 on cover glass 44 can be determined by visual inspection (e.g., using camera equipment such as camera 70). The location of the boundary between the active and inactive areas of display module 52 can be difficult to discern visually without alignment marks such as alignment marks 48. The presence of alignment marks 48 provides readily discernable visual feedback on the orientation of the display module active area and thereby facilitates the alignment process. Alignment marks may also be used on cover glass 44 (e.g., on the underside of layer 50), but such alignment marks are generally not needed to discern the edges of opening 54 because mask 50 (and therefore the edges of opening 54) can be viewed through transparent cover glass 44.

Once system 58 has been used to align cover glass 44 and display module 52, cover glass 44 and display module 52 may be attached to each other. For example, a layer of transparent pressure sensitive adhesive may be interposed between cover glass 44 and display module 52. Positioning equipment 62 and 64 (e.g., computer-controlled equipment that is controlled using control unit 60) may be used to lower cover glass 44 onto the surface of display module 52 after alignment has been achieved. Once cover glass 44 and display module 52 have been attached to each other in this way, the combined structure may be mounted in device 10. This operation may be performed as part of a separate assembly step. During this assembly step, a flex circuit cable or other cable that handles display data for display module 52 may be used to connect display module 52 to a main logic board in device 10.

Figure 4:
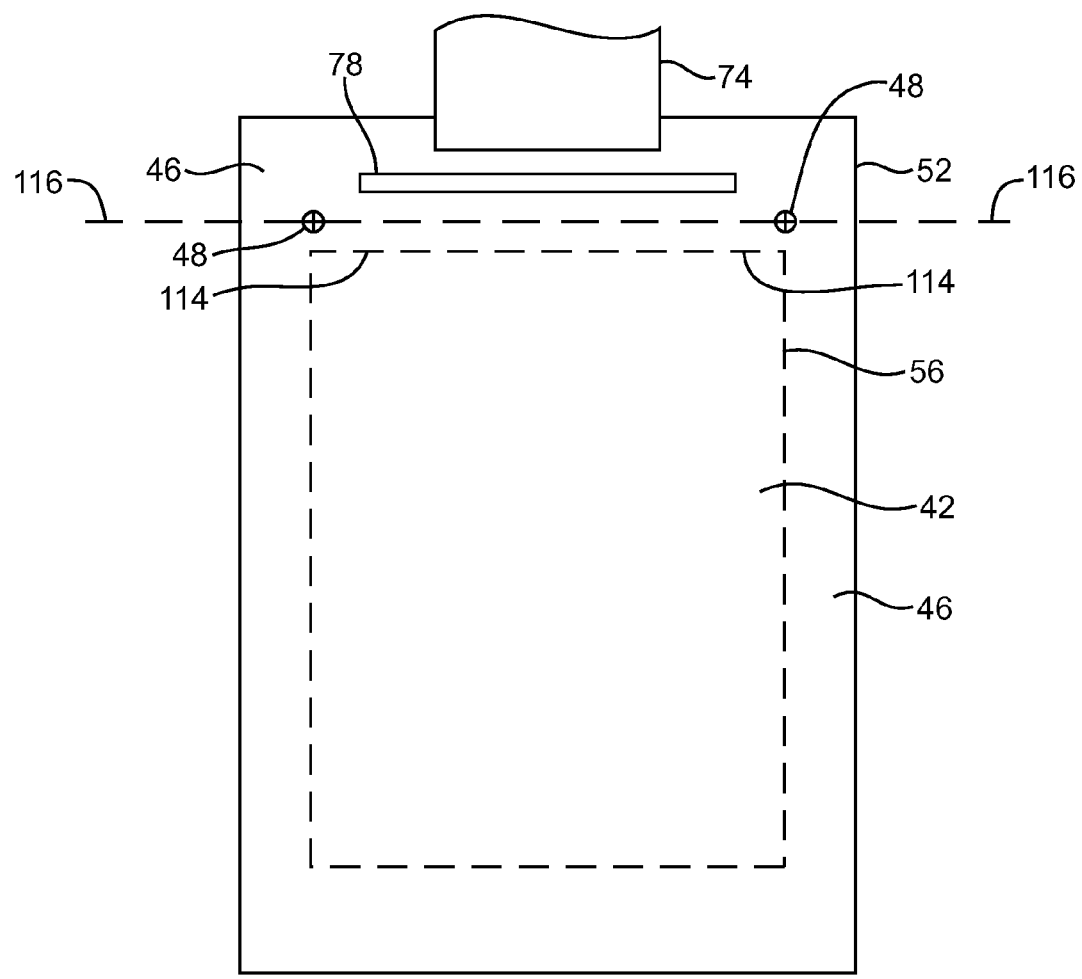
FIG. 4 is a top view of a display module with alignment marks showing how the alignment marks may be located outside of the active display area in accordance with an embodiment of the present invention.

A top view of display module 52 showing a possible location at which a flex circuit cable may be connected to the display module is shown in FIG. 4. As shown in FIG. 4, flex circuit cable 74 may be connected to display module 52 in an end portion of inactive area 46 (as an example). Alignment marks 48 may also be formed within this portion of inactive area 46 if desired. Alignment marks 48 may define an axis (axis 116) that is parallel to edge 114 of active area 42. Components such as integrated circuit 78 (e.g., a display driver chip) may be mounted in area 46 adjacent to the termination location for flex cable 74.

In conventional display modules, patterned metal features were formed on the upper side of the lower glass layer in the region of the lower glass layer that was not covered by the upper glass layer. This region of the lower glass layer was covered by black tape to prevent light leakage. The black tape included a hole over the patterned metal features to allow the patterned metal features to be viewed. This type of arrangement exposed the patterned metal features to potential damage and allowed light to escape through the holes in the black tape.

Figure 5:
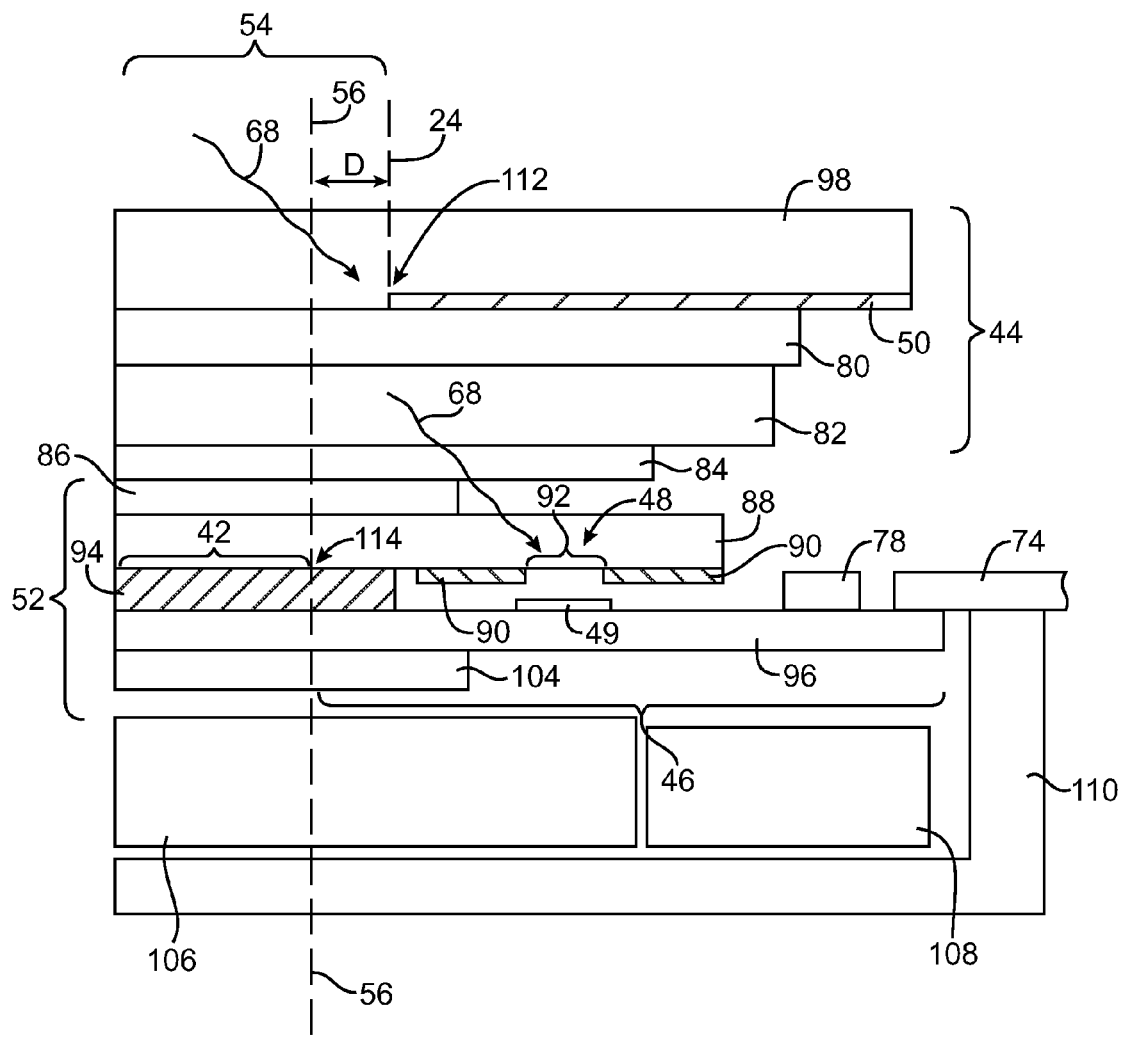
FIG. 5 is a cross-sectional side view of a portion of an electronic device showing how cover glass structures may be aligned to a display module with alignment features in accordance with an embodiment of the present invention.

FIG. 5 is a cross-sectional side view of an illustrative display module and cover glass structure showing how alignment marks may be formed in the display module to assist in the alignment process. The cross-section of FIG. 5 is taken along line 102 of FIG. 1 and is viewed in direction 76 of FIG. 1. As shown in FIG. 5, cover glass structures 44 may include cover glass layer 98, opaque mask layer 50, pressure sensitive adhesive 80, and touch sensor layer 82 (sometimes referred to as "touch glass"). Pressure sensitive adhesive 84 may be used to mount cover glass structures 44 to display module 52. Display module 52 may be mounted in the interior of housing 12 using plastic support structures 110.

Display module 52 may be based on LCD technology (as an example). LCD modules generally have upper and lower polarizer layers such as upper polarizer layer 86 and lower polarizer layer 104. Upper polarizer 86 may be formed above the upper surface of upper glass layer 88. Lower polarizer 104 may be formed below the lower surface of lower glass layer 96. Liquid crystal display structures 94 may be formed between glass layers 88 and 96. Liquid crystal display structures 94 may include thin film transistors, liquid crystal material, and other structures that form image pixels for display 16. The portion of structures 94 to the left of dashed line 56 correspond to active area 42 of display module 52 (i.e., active image pixel structures). The portion of the structures to the right of dashed line 56 correspond to inactive area 46.

An LCD display module may be provided with a backlight. In the example of FIG. 5, display module 52 is backlit using light source 108 (e.g., a light-emitting diode light source) and backlight structures 106. Source 108 provides light to backlight structures 106. Backlight from structures 106 passes upwards through the active elements of display module 52 for viewing by a user. To prevent stray backlight from becoming visible to the user, display module 52 may be provided with an opaque masking layer such as a layer of black ink. For example, display module 52 may be provided with a masking layer such as masking layer 90 around the periphery of the underside of glass layer 88 (i.e., in inactive area 46).

Alignment marks such as alignment mark 48 may be formed within the interior of display module 52. For example, alignment mark 48 may be formed from a layer of metal or other material such as metal 49 on the upper surface of lower glass layer 96 and an opening in masking layer 90 such as opening 92. An advantage of using metal (including metal alloys) for the alignment structures (e.g., metal structure 49) is that metal is generally reflective to visible light. This helps ensure that alignment markers 48 (e.g., metal 49) will be visible during the alignment process. Another advantage of using metal for the alignment structures is that metal is generally opaque and light from backlight structures 106 therefore cannot escape through metal structure 49 (e.g., light cannot escape through alignment structure 48). Metal 49 may sometimes be referred to herein as an alignment structure, a metal structure, alignment metal, and a metal alignment structure.

An opening in masking layer 90 such as opening 92 may be provided to allow metal 49 to be illuminated by light 68 and to allow alignment mark 48 to be visually inspected (e.g., using camera equipment 70). During alignment operations with alignment and assembly tool 58 of FIG. 3, cover glass 44 is aligned with display module 52 by ensuring that edge 112 of masking layer 50 is parallel with edge 114 of active layer 42 of display module 52. Lateral and rotational alignment operations may be performed. As shown in FIG. 4, alignment marks 48 may be provided at opposing corners at one of the ends of display module 52, so as to define an axis such as axis 116 that runs parallel with edge 114 of active area 42.

It can be difficult to view edge 114 directly with tool 58, but metal 49 will be visible through opening 92 in masking layer 90. Because the alignment marks are fabricated on display module 52 so that axis 116 is aligned with edge 114, it is possible to align edge 112 of opening 54 with edge 114 of active area 42 (i.e., to make these two edges parallel to each other) by aligning alignment marks 48 to edge 112 of masking layer 50. There may be a slight separation D (e.g., 0-5 mm) between edge 114 and edge 112 of opening 54 and edge 114 active area 42, but when alignment is obtained, all four edges of the opening formed in masking layer 50 will be parallel to the four corresponding edges of active area 42. The opening in mask layer 50 will also generally be centered over active area 42.

Figure 6:
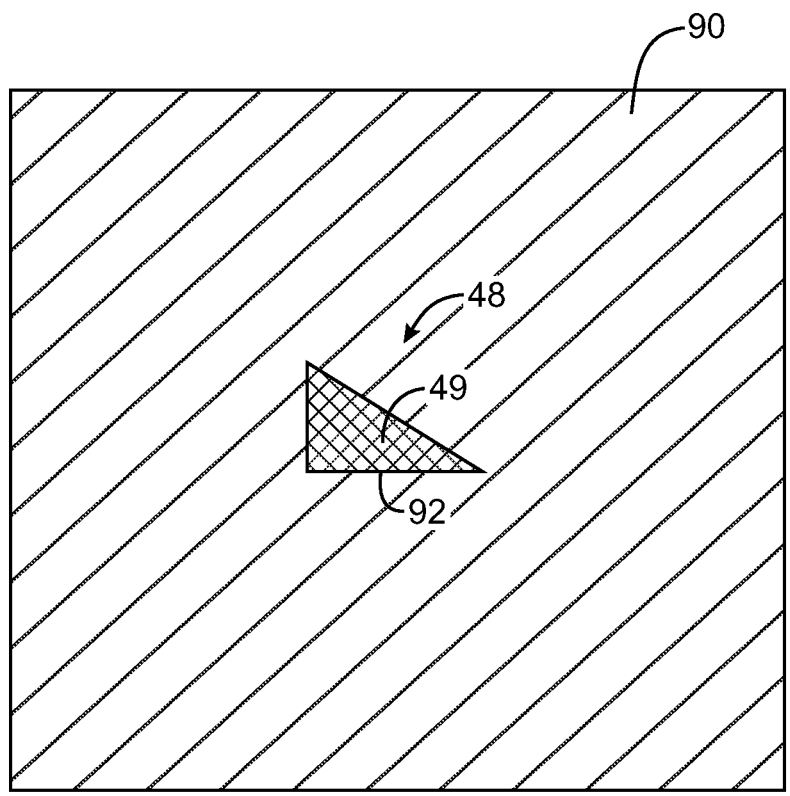
FIG. 6 is a top view of a portion of an illustrative display module having a triangular alignment structure that is visible through a triangular opening in an opaque display module masking layer in accordance with an embodiment of the present invention.
Figure 7:
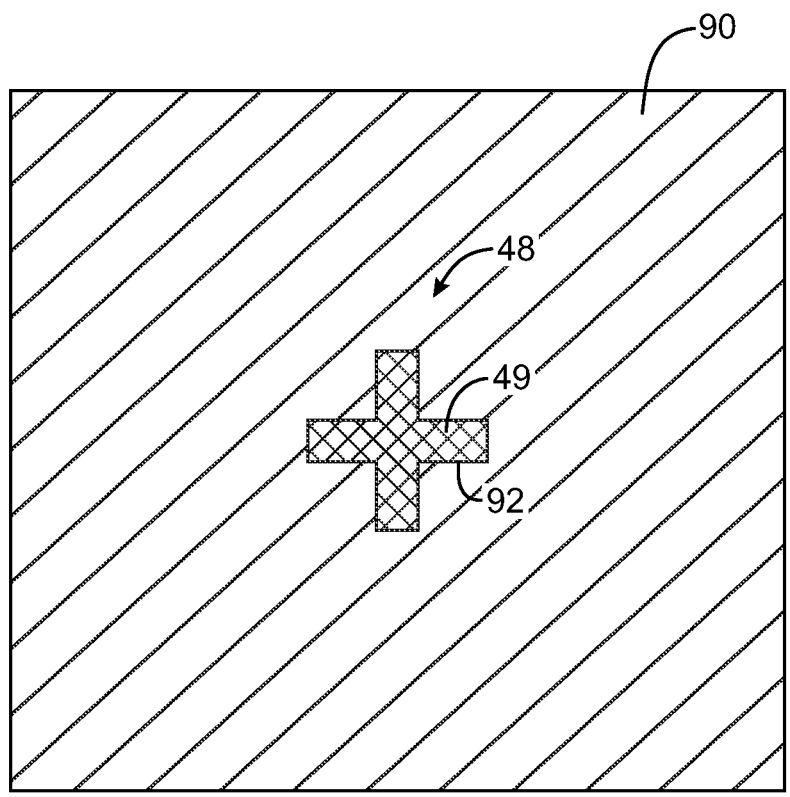
FIG. 7 is a top view of a portion of an illustrative display module having a cross-shaped alignment structure that is visible through a cross-shaped opening in an opaque display module masking layer in accordance with an embodiment of the present invention.

There may be any suitable number of openings 92 in layer 90 in a given display module 52. For example, there may be two openings 92 at opposing corners of display module 52 or there may be more than two openings. If the size of openings 92 is too large, light from backlight structures 106 might leak into view by a user of device 10 through the transparent layers of display module 52 and cover glass structures 44. Openings such as opening 92 may therefore be configured to consume a relatively small fraction of the inactive area in the end of device 10 (i.e., less than 30% or less than 10% of inactive portion 20 of FIG. 1). Metal 49 and openings 92 (e.g., alignment marks 48) may have any suitable shapes and sizes. In the example of FIG. 6, metal 49 and hole 92 are triangular (e.g., mark 48 is triangular). In the example of FIG. 7, metal 49 and hole 92 have a cross shape (e.g., mark 48 has a cross shape). As other examples, metal 49 and openings 92 (e.g., alignment marks 48) may be formed in a circular shape, a rectangular shape, a square shape, a star shape, a random shape, a crescent shape, a polygonal shape, and a shape from a combination of these and other shapes. If desired, the shapes of metal 49 and openings 92 may be based on the shape of display 16. For example, metal 49 and openings 92 may be formed in a crescent shape when display 16 is circular or has curved edges.

Figure 8:
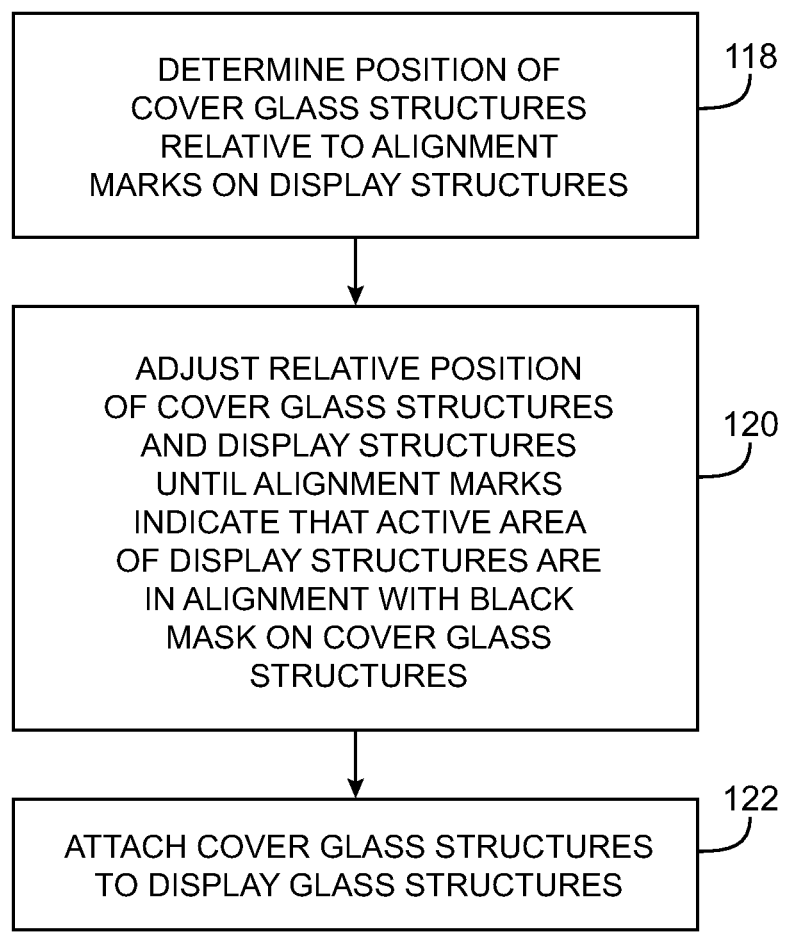
FIG. 8 is a flow chart of illustrative steps involved in aligning and attaching a cover glass structure and a display module with alignment features using a system of the type shown in FIG. 3 in accordance with an embodiment of the present invention.

Illustrative steps involved in aligning cover glass structures 44 and display module 52 using equipment of the type shown in FIG. 3 are shown in FIG. 8.

At step 118, the position of the cover glass structures relative to alignment marks 48 is determined by visual inspection. The orientation of edge 112 of masking layer 50 on the underside of cover glass layer 98 (FIG. 5) may be compared to the orientation of the axis defined by alignment marks 48 (i.e., axis 116 of FIG. 4, which is parallel to edge 114 of active display area 42 on display module 52). This allows the angular orientation and linear displacement of cover glass opening 54 relative to active area 42 to be determined.

At step 120, appropriate adjustments are made to the relative positions of cover glass 44 and display module 52 to align cover glass opening 54 and active area 42. These adjustments may include lateral position adjustments and adjustments in angle A that alter the relative position between cover glass 44 (and opening 54) and display module 52 (and area 42). Position adjustments may be made using positioning equipment 62 and 64 (manually or using commands provided by control unit 60).

Once alignment is complete, positioning equipment 62 and 64 may be used to attach cover glass 44 to display module 52 (step 122). A layer of pressure sensitive adhesive such as adhesive 84 of FIG. 5 may be used to attach cover glass 44 and display module 52. Once display module 52 and cover glass 44 have been assembled in this way, the resulting module may be assembled into device 10 (e.g., flex cable 74 of FIG. 4 may be connected to a logic board and the module made up of cover glass 44 and display module 52 may be mounted in the interior of housing 12).

The foregoing is merely illustrative of the principles of this invention and various modifications can be made by those skilled in the art without departing from the scope and spirit of the invention.

What is claimed is:

1. A display module comprising:
    first and second glass layers;
    an opaque masking layer between the first and second glass layers;
    an alignment mark formed from an alignment structure and portions of the opaque masking layer that define at least one opening over the alignment structure; and
    a third glass layer overlying the first glass layer, the third glass layer including a second opaque layer hiding the alignment mark from view.

2. The display module defined in claim 1 further comprising liquid crystal display structures interposed between the first and second glass layers.

3. The display module defined in claim 2 further comprising an additional alignment mark, wherein the alignment mark and the additional alignment mark are located at opposing corners of the display module.

4. The display module defined in claim 1 wherein the first and second glass layers comprise upper and lower glass layers, wherein the opaque masking layer is formed on the upper glass layer, and wherein the alignment structure is formed on the lower glass layer.

5. The display module defined in claim 1 wherein the opaque masking layer is formed on the first glass layer and wherein the alignment structure is formed on the second glass layer, the display module further comprising an integrated circuit mounted on the second glass layer.

6. The display module defined in claim 1 wherein the first and second glass layers have opposing inner surfaces and wherein the opaque masking layer is formed on one of the inner surfaces.

7. The display module defined in claim 6 wherein the alignment structure comprises a metal structure that is adjacent to the opening and that is formed on another one of the inner surfaces.

8. Display structures, comprising:
 a first transparent layer;
 a second transparent layer;
 at least some active pixel structures between the first transparent layer and the second transparent layer;
 a third transparent layer overlying the first transparent layer; and
 alignment marks on the second transparent layer hidden from view by a mask layer of the third transparent layer, the alignment marks facilitating alignment of the first, second and third transparent layers; wherein
 said first and second transparent layers comprise liquid crystal display module glass layers; and
 the display structures further comprise polarizer layers that surround the first and second transparent layers.

9. The display structures defined in claim 8 further comprising an opaque masking layer on the first transparent layer, wherein the alignment marks are formed from alignment structures and openings in the opaque masking layer adjacent to the alignment structures through which the alignment structures are viewed.

10. The display structures defined in claim 8, further comprising a backlight structure that emits light that is at least partly blocked by the opaque masking layer.

11. The display structures defined in claim 8 further comprising a backlight structure that emits light that is at least partly blocked by the opaque masking layer.

12. The display structures defined in claim 8 further comprising a display driver integrated circuit mounted to the second transparent layer.

13. The display structures defined in claim 8 further comprising a flex circuit attached to the second transparent layer.

14. The display structures defined in claim 13 wherein the alignment marks comprise metal alignment structures formed at corners of the second transparent layer.

15. The display structures defined in claim 8 wherein the alignment marks comprise metal alignment structures formed at corners of the second transparent layer.

16. The display structures defined in claim 15 further comprising an opaque masking layer on the first transparent layer, wherein the alignment marks are formed from the metal alignment structures and openings in the opaque masking layer adjacent to the metal alignment structures through which the metal alignment structures are viewed.

\* \* \* \* \*